Oct. 12, 1971   F. R. VAN ANTWERP   3,611,686
AUTOMATIC HEADER CONTROL APPARATUS
Filed June 13, 1967   3 Sheets-Sheet 1

INVENTOR
FERNE R. VAN ANTWERP
BY
Robert Henderson
ATTORNEY

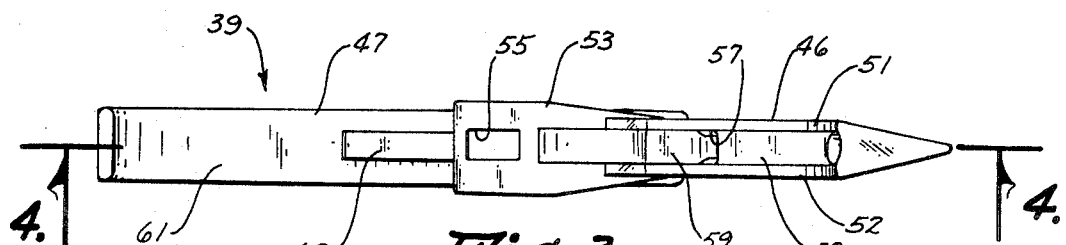
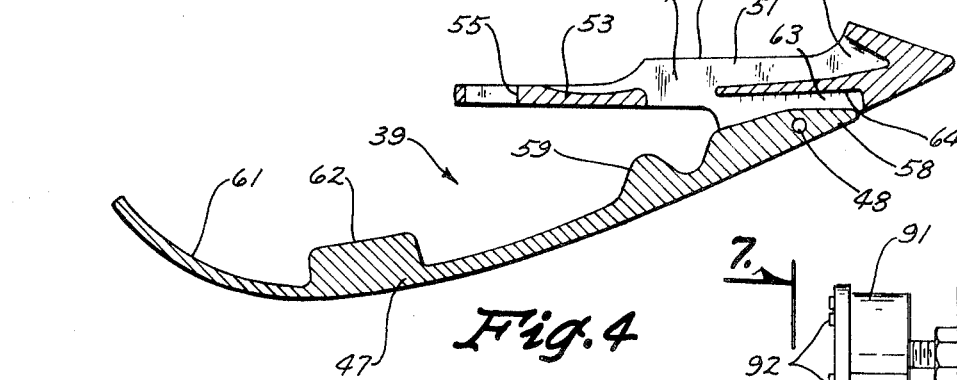
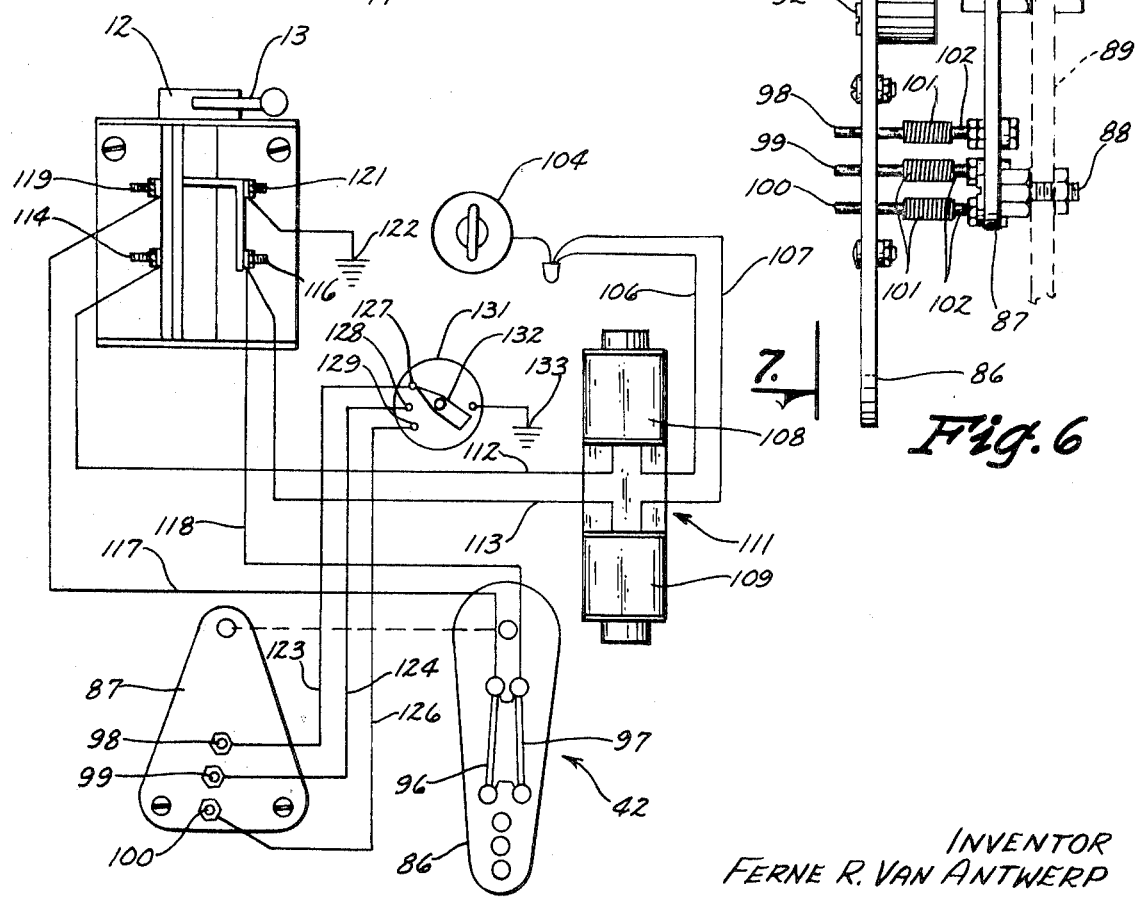

Oct. 12, 1971   F. R. VAN ANTWERP   3,611,686
AUTOMATIC HEADER CONTROL APPARATUS
Filed June 13, 1967   3 Sheets-Sheet 3

INVENTOR
FERNE R. VAN ANTWERP
BY
J. Robert Hardina
ATTORNEY

United States Patent Office 3,611,686
Patented Oct. 12, 1971

3,611,686
AUTOMATIC HEADER CONTROL APPARATUS
Ferne R. Van Antwerp, Plano, Iowa 52581
Filed June 13, 1967, Ser. No. 645,740
Int. Cl. A01d 67/00
U.S. Cl. 56—208                                   7 Claims

ABSTRACT OF THE DISCLOSURE

This invention relates to harvesters in general, and more particularly to the ground engaging feelers or sensors associated with automatic header controls. The sensors of the present invention are independent of each other, are mounted on the cutter blade finger guards, and are also independently movable relative to a rock shaft or sensor follower. An ancillary phase of the invention relates to an improved mechanically operable electric switch responsive to the sensor follower, which switch has a plurality of independent, parallel contacts bendable into simultaneous contact with either of a pair of spaced bars electrically connected to a main header control switch.

BACKGROUND OF THE INVENTION

The field of this invention pertains to automatic header control apparatus for combines for regulating the effective cutting height of the cutting head.

The use of pivotal feelers for engaging the ground whereby to transmit the level of the ground surface to control means for raising or lowering the cutting head of a combine has been known for years.

U.S. Pats. 2,750,727 and 3,088,264 both describe such feelers, the former patent with particularity. This type of feeler has several disadvantages, however, one being that the pivotal mounting of the feelers is too far behind the cutting blade. Thus, the blade could actually be digging into the ground before the feeler sensed the surface rise. Another disadvantage is in the feeler being physically connected to the rock shaft biased toward the ground. This prevents the combine from backing up without endangering the entire sensor unit, for should one feeler dig into the ground, not only would one or several feelers bend or break, but the entire rock shaft unit could well be damaged.

The latter disadvantage is highlighted by the feelers and rock shaft being integral so that damage to but one part would cause the entire unit to be replaced. With each feeler separate from the rock shaft, each feeler is not only more capable of containing any damage to itself, but it has a lighter control touch than prior art feelers in that to raise it does not require lifting all the other feelers. Furthermore, by pivotally mounting each feeler on a finger guard, rather than on the rock shaft, the feeler is substantially more rugged, and will enable the combine to back up.

SUMMARY OF THE INVENTION

The present invention has as its primary object the overcoming of the disadvantages of present day feelers set forth hereinbefore, in addition to other disadvantages not elaborated upon, and the providing of an improved feeler unit.

The present feeler unit disassociates the rock shaft from the feelers as integral units, provides that damage to one feeler does not cause damage to another or to the rock shaft, mounts each feeler sufficiently forward of the header angle such that sensing is accomplished in time to be worthwhile, forms each feeler such that reverse movement of the combine does not result in the feeler digging in, and provides a lighter more accurate sensing of the ground surface.

More particularly, by pivoting the rearwardly extending ground followers forwardly of the cutter bar, the actual sensing of the ground surface occurs below the most pertinent structure of the cutting head, that being the combined cutter bar and the blades secured thereto. The most effective use of the cutter bar unit is thereby ensured.

A further object of this invention is the provision of an improved switch responsive to operation of the feeler unit for transmitting said operation to the combine header main control system.

These and other objects, features and advantages will become readily apparent upon reference to the following description and the accompanying drawings.

BRIEF DESCRIPTION OF THE DRAWINGS

FIG. 3 is a plan view of the feeler unit of this invention;

FIG. 4 is a sectional view taken along the line 4—4 in FIG. 3;

FIG. 5 is a schematic of the electric wire circuit, and appropriate elements associated therewith, of the apparatus of this invention;

FIG. 6 is an enlarged side elevational view of a control switch of the present invention;

DESCRIPTION OF THE PREFERRED EMBODIMENT

Figure 1:
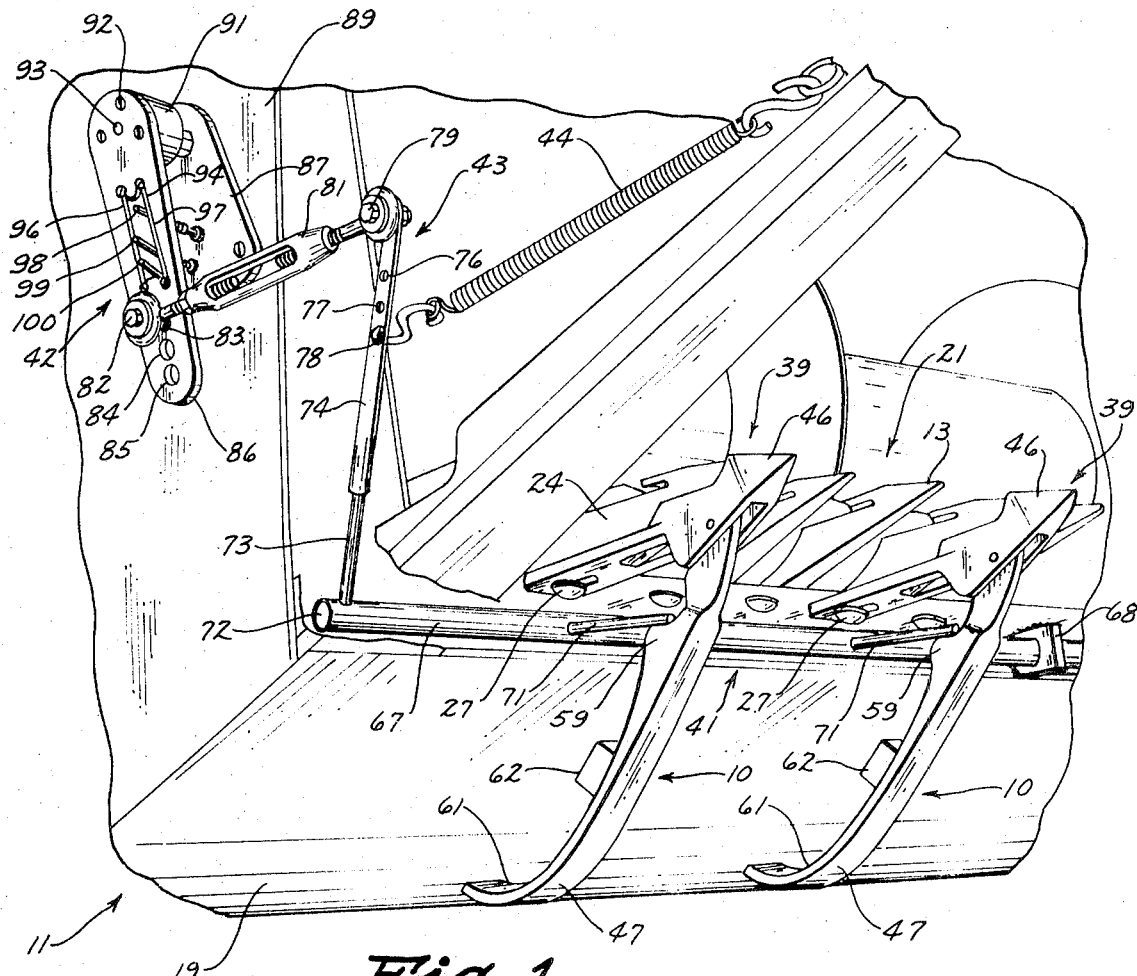
FIG. 1 is a fragmentary, perspective view of a portion of the front of a combine, showing the automatic header control apparatus of this invention assembled therewith.

Referring now to the drawings, the automatic header control apparatus of this invention is indicated generally at 10 in FIG. 1, shown assembled to the header unit 11 of a harvesting machine.

Figure 10:
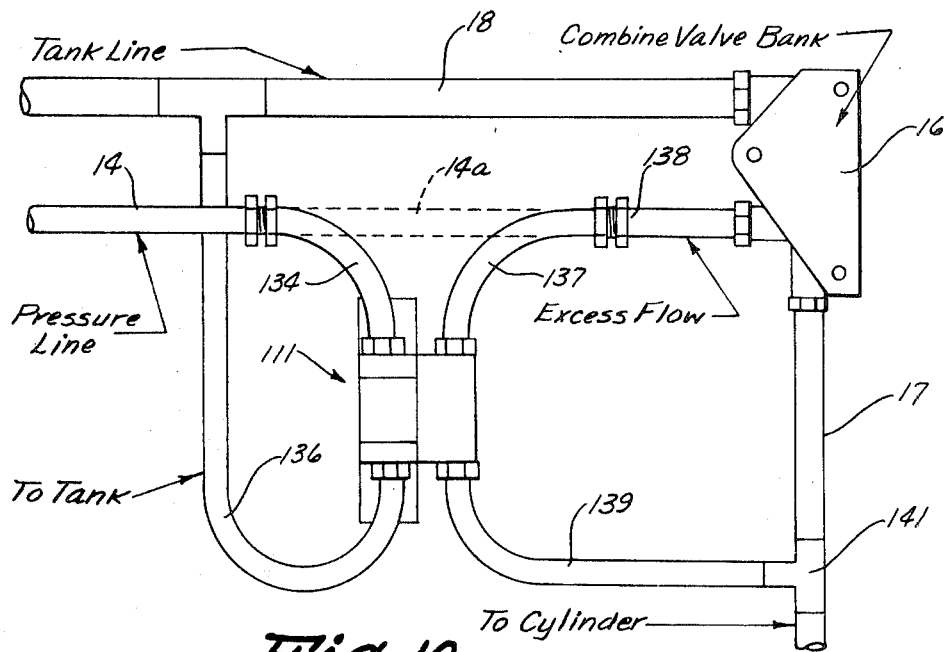
FIG. 10 is a schematic of the hydraulic circuit for the present invention.

Not shown, except schematically in FIGS. 5 and 10, one or more hydraulically operable piston and cylinder devices are secured between the machine and the pivotally mounted header unit 11 for raising and lowering same. These cylinder devices are conventionally controlled by the header control section of a valve bank 16 (FIG. 10), manually operated by a handle (not shown), such that fluid transmitted through a pressure conduit 14 (FIG. 10) directly by means of a dotted line conduit 14a (not used when the automatic header control apparatus control 10 of this invention is provided) to the valve bank 16 for the header operation is then either directed to the cylinders by means of a conduit 17, or is returned through conduit 18 to the fluid reservoir or tank for the harvesting machine. The header unit 11 includes further a grain pan 19 having a cutter bar unit 21 extended along a reinforcing angle iron 22 secured to the front edge of the pan 19. Rotatably mounted in the pan is a screw conveyor 23 (FIG. 1) for discharging grain cut by the cutter bar unit 21 through an opening (not shown) into the threshing mechanism of the harvester.

The cutter bar unit 21 is of usual construction and comprises a cutter guard 24 (FIG. 2) which is attached to the horizontal flange 26 of the reinforcing angle 22 by bolts 27 extending through the edge of the pan 19, through the flange 26 of the angle 22, and through ears 28 on the rear edge of the guard 24. The guard includes further the usual teeth 29 projecting forwardly of the pan 19 and provided with rectangular-shaped seats 31 in their upper faces adjacent the flange 26 for receiving a reciprocating cutter bar 32.

Riveted to the cutter bar 32 are the cutter blades 33 which reciprocate through slots 34 formed in the cutter guard teeth 29 so that grain entering between the teeth is severed by the blades to fall into the grain pan 19. The cutter bar 32 is retained in sliding relation with the cutter guard 24 by a plurality of clips 36 secured at intervals along the front edge of the pan 19 by the bolts 27 and having forwardly projecting arms 37 extending over the top face of the cutter bar 32. The arms 37 are recessed on their undersides to clear the heads of the rivets 38 connecting the cutter blades 33 to the bar 32.

The structure of the harvester described thus far is believed conventional, and in no way forms a part of the present invention except by association therewith.

The automatic header control apparatus 10 of this invention comprises basically one or more ground engageable sensors 39 (FIGS. 1 and 2), each sensor 39 vertically movable in direct response to its engagement with the ground; a sensor follower assembly indicated generally at 41 engageable with one or more of the sensors 39; an electric switch assembly 42 (FIGS. 1 and 5) operatively connected to the header master control switch 12 for control thereof in response to position of the follower assembly 41; a linkage assembly indicated generally at 43 in FIG. 1 which is connected between the switch assembly 42 and the follower assembly 41 for transmitting movement of the latter to the former; and a spring 44 connected between a portion of the header unit 11 and the linkage assembly 43 for maintaining the follower assembly 41 in following engagement with at least one of the sensors 39.

Figure 2:
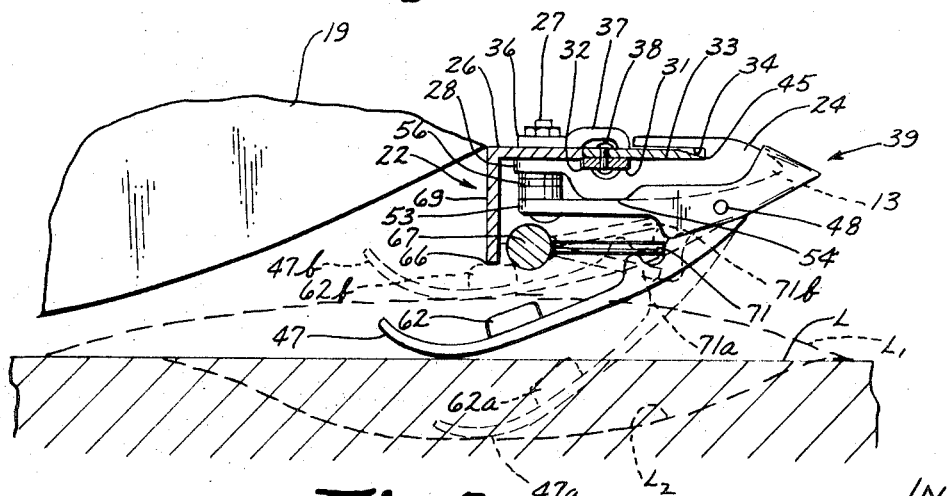
FIG. 2 is a vertical sectional view taken through the cutter bar unit of the invention, and showing by the use of full and dotted lines various positions of a feeler member of this invention.

As each sensor 39 is identical, only one will be described with like reference numerals indicating like parts. Referring particularly to FIGS. 2, 3 and 4, each sensor 39 comprises a guard attachment 46 and a ground follower 47 pivotally attached to the front portion of the attachment 46 by a pivot 48. Referring to FIG. 2, it will be noted that the pivot 48 is located forwardly of the leading edge 45 of the cutter blades 33.

The guard attachment 46 is an elongated element of strong, heat treated, nodular iron, as is the ground follower 47, and has formed in the nose thereof a cavity 49 adapting itself to a complementary fit about the nose of a guard 24 (see FIG. 2) for additional embrace of the cutter guard 24, the cavity is extended rearwardly by means of sidewalls 51 and 52, and with an aft flange 53 adapted to engage the underside 54 (FIG. 2) of the guards lowermost portion. By means of an aperture 55 (FIGS. 3 and 4) formed in the flange 53 of the attachment 46, the attachment is secured to the ear 28 of a guard 24 by the same bolt 27 securing the ear to the horizontal flange 26 of the reinforcing angle 22. A plurality of washers 56 (FIG. 2) are normally added to the structure so as to properly secure the guard attachment 46 to the guard 24 as best illustrated in FIG. 2. The guard attachment 46 also has an opening 57 formed intermediate the ends thereof, but which opening is not critical.

Each ground follower 47 is also of an elongated construction of nodular iron, and includes a nose portion 58 pivotally connected by the pivot 48 to the under portion of the guard attachment 46, has a rounded lift projection 59 formed behind the nose 58, and includes an upwardly and rearwardly curved rear end 61 with a limit boss 62 formed on the upper surface. Of note, some models do not have the boss 62 thereon. A space 63 is provided between the nose 58 of the follower 47 and the underside 64 of the attachment 46 wherein in a normal condition of the follower 47 relative to the attachment 46, as best shown in FIG. 4, and by full lines in FIG. 2, the follower 47 may not only be raised relative to the attachment 46, as shown at 47b in FIG. 2, but it may also freely drop to a lower position as best illustrated at 47a in FIG. 2, the gravitational drop being limited only by the nose 58 contacting the underside 64.

The utilization of the lift projection 59 will be seen hereinafter. With respect to the limit boss 62, by referring to FIG. 2 it is seen that the boss 62 is provided to limit the upward movement of the follower 47, in response to the changing level L1 of the ground from the normal level L thereof. Thus, upon the limit boss 62b (FIG. 2) striking the bottom edge 66 of the reinforcing angle 22, further upward movement of the follower 47 is thereby prevented.

The sensor follower assembly 41 comprises a straight, elongated rock shaft 67 (FIGS. 1 and 2) which is rotatably mounted in a plurality of bearing blocks 68 (only one showing) which are secured to the forward face of the vertical flange 69 of the reinforcing angle 22. Rock shaft 67 extends parallel to the vertical flange 69 and is spaced forwardly thereof as best illustrated in FIG. 2 so as to be rotatable about a normally horizontal axis. At each sensor 39, a follower pin 71 is secured to the rock shaft 67 for a light, sensitive engagement with the lift projection 59 of the ground follower 47 (FIG. 2).

At one end 72 (FIG. 1) of the rotatable rock shaft 67, an actuating arm 73 is secured, which is further secured to an elongated lever 74 having a plurality of holes 76, 77 and 78 formed therein for adjustment purposes. The lever 74 is pivotally connected at its upper end at 79 to a turnbuckle 81, the free end of which is in turn pivotally connected by a pin 82 to any one of a trio of holes 83, 84 and 85 formed in the lower end of an arm 86 of the switch assembly 42.

It may be appreciated that due to the provision of the holes 76-78 in the lever 74, and the holes 83-85 in the switch arm 86, an articulated linkage arrangement between the switch arm 86 and the rock shaft 67 may be provided whereby tension of the spring 44 is such as to position the rock shaft 67 and the follower pins 71 thereof in any one of a predetermined number of positions.

Referring to FIG. 2, the full line position of the follower pin 71 shown therein may be termed a neutral position as determined by the relationship of the aforementioned sensor follower assembly 41 and linkage assembly 43. Upon a gravitational dropping of the ground follower 47 due to a depression of the ground level L2, the follower pin 71 for the particular ground follower 47 will follow the follower 47 downwardly. Should only one ground follower 47 drop downwardly, with any one or more of the others remaining in a raised position, the entire follower assembly 41 remains in the raised condition; as the retaining of any one pin 71 or more in the raised condition would prevent the rock shaft 67 from rotating clockwise as viewed in FIG. 2 to lower the pins 71, until every lift projection 59 was removed as an obstruction against such clockwise movement. Conversely, should the rock shaft 67 and its follower pins 71 be in the lowered condition of the follower 47a, should any one single follower 47 be raised, with the remaining followers staying in their lowered conditions, the rock shaft 67 would rotate in a counterclockwise position as illustrated in FIG. 2 from the lowermost condition of the follower pin 71a toward the uppermost condition 71b thereof.

Referring to FIG. 1, rotation of the rock shaft 67 in a clockwise manner due to the ground followers 47 dropping, results also in clockwise movement of the lever 74 and counterclockwise movement of the switch arm 86. Conversely, a raising, counterclockwise rotation of the rock shaft 67 (FIG. 2) due to a raising movement of one or more ground followers 47 results in a counterclockwise rotation of the lever 74 as viewed in FIG. 1, and a clockwise rotation of the switch arm 86.

Referring to the switch arm as shown in FIG. 1, and also as shown in FIGS. 6, 7, 8 and 9, the arm 86 is part of the entire switch assembly 42. The assembly 42 also comprises a base 87 which is secured as by one or more bolts 88 (FIG. 6) to the side 89 of the header unit 11.

A housing 91 is secured to the switch arm 86 as by a plurality of screws 92, and with the housing 91 mounted on a shaft 93, the shaft itself passing through the base 87 and being secured to the header side 89.

Figures 7, 8, 9:
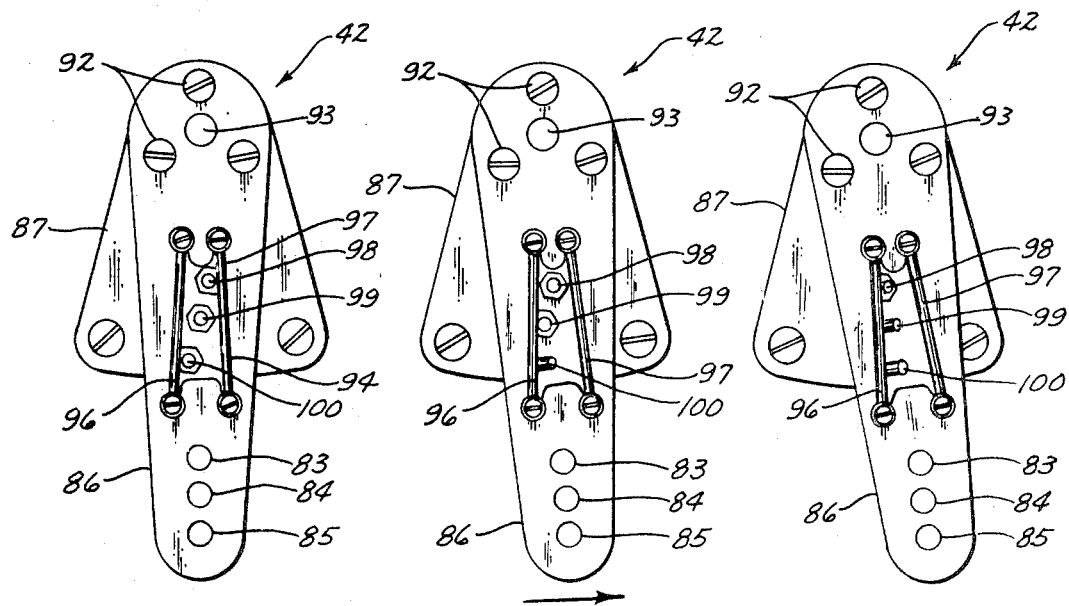
FIGS. 7–9 inclusive are plan views of the control switch of FIG. 6; with FIGS. 8 and 9 showing selective pivoted positions of a portion of said switch.

The switch arm 86 has a substantially rectangular opening 94 (FIG. 7) formed therein intermediate its ends, and along the sides of which are secured a pair of contact bars 96 and 97. On the base 87, a trio of upstanding poles 98, 99 and 100 are secured in an angular relationship to each other as best shown in FIG. 7, but also in a parallel relationship as shown in FIG. 6. Each pole is flexible relative to the base and to the adjacent poles by means of a coil-type spring 101 mounting each pole to a stub 102 extended outwardly from the base 87. Each pole is thereby flexed in any direction.

The normal arrangement of the poles is such that pole 100 engages and "leans" against bar 96, wherein pole 98 engages and "leans" against bar 97, such that the center pole 99 is normally centered between both contact bars 96 and 97. Referring to FIG. 8, it is seen that should the switch arm 86 be moved in a counterclockwise direction, as where the rotating member 67 and the follower pins 71 are following the ground followers 47 downwardly, the leftmost contact bar 96 not only engages the leftmost pole 98, but also the center pole 99. Further counterclockwise rotation of the switch arm 86 as shown in FIG. 9, brings the leftmost contact bar 96 in contacting engagement with all three poles 98–100 inclusive. The purpose of this will be seen hereinafter.

Referring to the electric wiring diagram of FIG. 5, from the ignition switch 104 for the harvester extend a pair of wires 106 and 107 which are connected, respectively, to a header unit "lower" solenoid 108 and to a header unit "raise" solenoid 109, both solenoids operably connected to a hydraulic valve unit 111 (see also FIG. 10) interposed between the original pressure line 14 and the lift cylinder line 17 as described more in detail hereinafter. Actuation of the lower solenoid 108 results in the header unit 11 dropping from one position above the ground surface to a lower position thereover, with operation of the "raise" solenoid 109 resulting in the header unit 11 being raised from one point relative to the ground to one raised further thereover.

The solenoids 108 and 109 are electrically connected by lines 112 and 113, respectively, to opposite side contacts 114 and 116 of the master control drum switch 12. The automatic switch arm contact bars 96 and 97 are electrically connected through lines 117 and 118, respectively, to opposite side contacts 119 and 116 of the drum switch 12, with an upper contact 121 being grounded at 122. The side contacts 114 and 119, as are the side contacts 116 and 121, are connected internally of the drum switch 12 by operation of the handle 13 to a predetermined position for obtaining automatic utilization of the automatic header control apparatus 10.

Electrically connected with the three poles 98, 99 and 100 (FIG. 5) on the base 87, by three lines 123, 124 and 126, respectively, are three contacts 127, 128 and 129 formed on a height selector switch 131. The contacts 127–129 are selectively engaged by a manually rotatable arm 132, whereby depending upon which contact is engaged by the arm, the respective pole on the base 87 electrically connected with the engaged contact is thereby connected to ground at 133. The import of this will be seen hereinafter.

Referring to FIG. 10, a modification to the conventional hydraulic system for the purpose of utilizing the automatic header control apparatus 10 of this invention is best illustrated. The hydraulic valve unit 111 has connected to one side thereof a conduit 134 which is connected to the outlet end of the pressure line 14, now disconnected from the combine valve bank 16. The other side of the hydraulic valve unit 111 is connected by a conduit 136 as a tank return line to the line 18. Another portion of the valve unit 111 is connected by a conduit 137 to the inlet end 138 of the now disconnected pressure line 14 for the valve bank 16 for transmitting excess flow thereto; whereas conduit 139 connects the valve unit 111 to a T 141 in the cylinder conduit 17 for transmitting the fluid to the lift cylinders (not shown) for operation thereof. A description of the internal operation of the hydraulic valve unit 111 is believed unnecessary. Suffice to say that the valve unit 111 includes a flow divider arrangement wherein part of the fluid under pressure entering the unit 111 through conduit 134 can be transmitted outwardly through conduit 137 for the hydraulic system of the combine, with the other part of the fluid being transmitted through conduit 139 for the header control operation.

In a neutral condition of the valve 111, fluid entering the unit is prevented from leaving through conduit 139 such that no automatic controlled movement of the header unit is obtained. If the "raise" solenoid 109 (FIG. 5) is activated, the valve unit 111 is operated so as to transmit fluid through conduit 139 to activate the lift cylinders to raise the header unit 11. Conversely, activation of the "lower" solenoid 108 results in operation of the valve unit 111 so as to transmit a return flow of fluid through conduit 139 into the valve unit 111 and to exhaust same through conduit 136 to the combine tank or reservoir.

In placing the automatic header control apparatus 10 in operation, after making the hydraulic and electrical connections as illustrated particularly in FIGS. 5 and 10 herein, the rock shaft 67 is placed in a position as determined by the upper surface of the boss 62 (FIG. 2) being ⅜ of an inch from the bottom edge 66 of the reinforcing angle 22. In this condition of the rock shaft 67, the linkage assembly 43 is so arranged and connected to the switch arm 86 such that the raise contact bar 97 (FIG. 7) is engaged with all three poles 98–100.

Subsequent, the linkage assembly 43 may be modified so as to place the switch arm 86 in any position intermediate the last described condition of the raise bar 97, and the extreme condition of the lower bar 96 as illustrated in FIG. 9. A condition, however, of the position of the switch arm 86 is that at least one pole be intermediate the two contact bars 96 and 97. Thus the switch arm 86 may be in the FIG. 7 position, the FIG. 8 position wherein the switch arm has been moved slightly to the right of center, or an opposite position (not illustrated) where the switch arm 86 has been moved left of center ("center" being the FIG. 7 position of switch arm 86) wherein the pole 100 is centered between the contact bars 96 and 97.

In each case, and irrespective of the position of the switch arm 86, the rock shaft 67 is always positioned with the follower pins 71 being in a neutral condition relative to the capability of moving upwardly or downwardly, said neutral position of the rock shaft being made with the switch arm 86 in its centered position as best illustrated in FIG. 7.

Assuming the switch arm 86 has been placed in the FIG. 7 position, with the height selector switch arm 132 engaging the contact 127, operation of the apparatus 10 is as follows. As the raise bar 97 is in contact with the grounded pole 98, the "raise" solenoid 109 is activated causing the header unit 11 to be raised. This results in the header unit moving upwardly and away from the ground level such that the ground followers 47 drop downwardly, which results in the follower pins 71 moving clockwise as viewed in FIG. 2. This results in a counterclockwise movement of the switch arm 86 from the FIG. 7 condition to the FIG. 8 condition wherein the grounded pole 98 is now placed intermediate the contact bars 96 and 97. The header control apparatus 10 will hold this condition. On the other hand, should the ground level L (FIG. 2) raise to L1, whereby the ground followers 47 are raised, thus causing the follower pins 72 to move in a counter-clockwise direction as viewed in FIG. 2, the switch arm 86 will thus be moved in a clockwise direction from the FIG. 8 condition to the FIG. 7 condition until the pole 98 engages the contact bar 97. This causes the "raise" solenoid 109 to be activated, whereby the header unit 11 is moved upwardly above the raised ground surface L1 until the condition of the rock shaft 67 again places the grounded pole 98 in its centered condition of FIG. 8.

By moving the height selector switch arm 132 to contact 128 whereby pole 99 is grounded instead of ploe 98, it is seen that operation of the automatic header control apparatus 10 will maintain the grounded pole 99 centered as shown in FIG. 7, all operation being identical as that described hereinbefore with respect to grounded pole 98. With pole 99 being grounded, it is readily seen that as soon as the switch arm 86 has been moved counterclockwise by a dropping of all ground followers 47, such that the lowering contact bar 96 engages the grounded pole 99, the hydraulic valve unit 111 is activated to lower the header unit 11 so as to maintain the predetermined spacing of the cutter bar unit 21 above the level of the ground.

Should a lowering of the header unit 11 be desired to be delayed beyond engagement of the contact bar 96 with the pole 99, the switch arm 132 (FIG. 5) need only be moved so that it grounds pole 98. Thus operation of the hydraulic valve unit 111 to lower the header unit 11 will not occur until the follower pins 71 have rotated in a counter-clockwise direction (FIG. 2) sufficient to move the switch arm 86 in a counter-clockwise direction until the contact bar 96 has engaged pole 98 as illustrated in FIG. 9.

In conclusion, it is to be noted that other than a following relationship between the rock shaft 67 and the ground followers 47, there is no physical connection therebetween. Consequently, damage to any one ground follower 47 in no way interferes with the rock shaft 67. Furthermore, as the linkage assembly 43 which is connected to the switch assembly 42, is connected to the rock shaft 67, again damage of any one or more ground followers 47 does not necessarily result in damage to either the switch assembly 42 or the linkage assembly 43.

In addition, as the ground followers 47 are pivotally mounted to a guard attachment 46 or sheath slipped on and secured to the conventional cutter guard 24, as compared to the arrangement where a ground follower is secured to the rock shaft, the present arrangement provides a much more rugged and durable structure which enables the ground followers 47 to act substantially as a plow upon a reverse movement of the combine whereby the ground followers 47 are neither bent nor broken from their mounting; and if such might happen, in reiteration, their damage in no way affects the successful, continued operation of the rock shaft 67 and the remainder of the apparatus 10.

Although a preferred embodiment of this invention has been described hereinbefore, it is to be remembered that various modifications can be made thereto without departing from the true scope and spirit of the invention as defined by the appended claims.

I claim:

1. In a harvester having a cutting head, lift means for moving the head up and down, control means for the lift means, and a cutter bar unit including a cutter bar, and a plurality of finger guards affixed to a reinforcing member, the improvement being an automatic header control apparatus comprising:

a plurality of laterally spaced ground engageable sensor members pivotally mounted on the cutter bar unit in front of the cutter bar relative to the intended direction of travel of the harvester, each member vertically movable only in response to its engagement with the ground;

sensor follower means movably mounted on said cutter bar unit and engageable with said members, said follower means movable upwardly in response to upward movement of one of said members, and movable downwardly in response to downward movement of all said members;

means connected between said follower means and the control means for effecting control of the control means in relation to a position of said follower means; and means for biasing said follower means toward engagement with at least one of said members.

2. The automatic header control apparatus as defined in claim 1, and wherein each sensor member comprises a guard secured to a finger guard, and a ground follower pivotally connected to said guard for movement in a vertical plane therebelow.

3. The automatic header control apparatus as defined in claim 2, and wherein each ground follower is operable to drop downwardly away from engagement with said sensor follower means.

4. The automatic header control apparatus as defined in claim 3, and wherein each said ground follower includes a forward end engageable with an undersurface of said guard to limit the downward movement of said ground follower, and wherein each ground follower is adapted to engage the cutting head to limit the upward movement of said ground follower.

5. The automatic header control apparatus as defined in claim 3, and wherein said sensor follower means comprises a rotatable rock shaft extended along the front edge of the cutting head, and a plurality of laterally spaced pins secured at one end to said rock shaft with the other end thereof resting on a top surface portion of a ground follower.

6. The automatic header control apparatus as defined in claim 1, and wherein said connected means comprises switch means operatively connected to the control means for control thereover in response to the position of said follower means, and linkage means connected between said follower means and said switch means for positioning said switch means in relation to a position of said follower means.

7. The automatic header control apparatus as defined in claim 6, and wherein said switch means comprises a base having a plurality of electric contact poles mounted thereon in angular relationship to each other, each pole flexibly mounted to said base in an upstanding position and capable of being flexed in any direction whereupon to return to said upstanding position, and comprises further a rotatable switch arm mounted on said base having a pair of electric bar contacts defining an opening formed therein through which said poles extend, the arrangement such that each bar is sequentially engageable with all three poles as said each bar is moved toward said three poles, said switch means including an electric circuit in which said poles and bars are electrically connected.

References Cited
UNITED STATES PATENTS

| 3,383,845 | 5/1968 | Hirsch et al. | 56—208 |
| 2,750,727 | 6/1956 | Wright | 56—208 |
| 3,286,448 | 11/1966 | Moore | 56—208 |

LOUIS G. MANCENE, Primary Examiner

J. A. OLIFF, Assistant Examiner